(12) United States Patent
Sutton et al.

(10) Patent No.: US 7,988,438 B2
(45) Date of Patent: Aug. 2, 2011

(54) EXTRUSION DIE VACUUM SEALS

(75) Inventors: Gerald S. Sutton, Hamilton, OH (US); William V. Shaffer, West Chester, OH (US); Randall A. Kolbet, Liberty Township, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 728 days.

(21) Appl. No.: 12/028,990

(22) Filed: Feb. 11, 2008

(65) Prior Publication Data

US 2009/0200694 A1   Aug. 13, 2009

(51) Int. Cl.
  *B29C 47/08*    (2006.01)
  *B29C 47/20*    (2006.01)

(52) U.S. Cl. .................. 425/113; 425/133.1; 425/326.1; 425/380; 425/461

(58) Field of Classification Search .................. 425/113, 425/133.1, 326.1, 380, 461
See application file for complete search history.

(56) References Cited

U.S. PATENT DOCUMENTS

| | | |
|---|---|---|
| 2,700,631 A | 1/1955 | Sussenbach et al. |
| 2,753,596 A | 7/1956 | Bailey |
| 2,877,150 A | 3/1959 | Wilson |
| 2,888,954 A | 6/1959 | Gates |
| 2,931,069 A | 4/1960 | McCormick |
| 3,081,102 A | 3/1963 | Murray et al. |
| 3,379,805 A | 4/1968 | Roberts |
| 3,490,496 A | 1/1970 | Stearns |
| 3,538,209 A | 11/1970 | Hegler |
| 3,573,871 A | 4/1971 | Warner |
| 3,605,232 A | 9/1971 | Hines |
| 3,649,730 A | 3/1972 | Lachenmeyer et al. |
| 3,677,676 A | 7/1972 | Hegler |
| 3,725,565 A | 4/1973 | Schmidt |
| 3,737,261 A | 6/1973 | Hardesty |
| 3,802,908 A | 4/1974 | Emmons |

(Continued)

FOREIGN PATENT DOCUMENTS

DE   1 278 734   9/1968

(Continued)

OTHER PUBLICATIONS

International Search Report and Written Opinion issued on May 26, 2009 in PCT/US2009/033461.

(Continued)

*Primary Examiner* — Yogendra N Gupta
*Assistant Examiner* — Joseph Leyson
(74) *Attorney, Agent, or Firm* — Finnegan, Henderson, Farabow, Garrett & Dunner, LLP

(57) ABSTRACT

An extrusion die configured to have an interior chamber sealed from the atmosphere is disclosed. The extrusion die includes an extrusion die head disposed at a downstream end of the interior chamber; and a vacuum seal disposed at an upstream end of the interior chamber; wherein the vacuum seal is configured to selectively form a seal between the extrusion die and a product disposed in the interior chamber. The vacuum seal includes an annular sealing surface disposed at an inner diameter of the vacuum seal; a hollow, interior chamber; and a plurality of bellows disposed between the annular sealing surface and the extrusion die; wherein the vacuum seal is configured to selectively form a seal between the extrusion die and a product disposed in the interior chamber. A method of selectively sealing an end of an extrusion die is also disclosed.

19 Claims, 2 Drawing Sheets

U.S. PATENT DOCUMENTS

| | | | |
|---|---|---|---|
| 3,819,292 A | 6/1974 | Wentworth | |
| 3,824,886 A | 7/1974 | Hegler | |
| 3,837,364 A | 9/1974 | Jenner | |
| 3,869,235 A | 3/1975 | Moore | |
| 3,895,085 A * | 7/1975 | Suzuki et al. | 264/154 |
| 3,940,300 A | 2/1976 | Priaroggia | |
| 3,944,641 A | 3/1976 | Lemelson | |
| 3,957,386 A | 5/1976 | Lupke | |
| 4,041,198 A * | 8/1977 | McPherson | 427/294 |
| 4,042,661 A | 8/1977 | Cook | |
| 4,113,411 A | 9/1978 | Terragni | |
| 4,165,214 A | 8/1979 | Lupke et al. | |
| 4,180,357 A | 12/1979 | Lupke | |
| 4,218,164 A | 8/1980 | Lupke et al. | |
| 4,219,293 A | 8/1980 | Licht | |
| 4,220,181 A | 9/1980 | Nyssen | |
| 4,223,895 A | 9/1980 | Roberts, Jr. et al. | |
| 4,230,157 A | 10/1980 | Larsen et al. | |
| 4,262,162 A | 4/1981 | Plinke et al. | |
| 4,281,981 A | 8/1981 | Feldman | |
| 4,319,476 A | 3/1982 | Fuchs, Jr. | |
| 4,352,701 A | 10/1982 | Shimba et al. | |
| 4,377,545 A | 3/1983 | Hornbeck | |
| 4,386,996 A * | 6/1983 | Landgraf et al. | 156/382 |
| 4,397,797 A | 8/1983 | Nojiri et al. | |
| 4,402,658 A | 9/1983 | Larsen | |
| 4,415,389 A | 11/1983 | Medford et al. | |
| 4,436,679 A | 3/1984 | Winstead | |
| 4,439,130 A | 3/1984 | Dickhut et al. | |
| 4,492,551 A | 1/1985 | Hegler et al. | |
| 4,523,613 A | 6/1985 | Fouss et al. | |
| 4,528,832 A | 7/1985 | Fuchs, Jr. | |
| 4,534,923 A | 8/1985 | Lupke | |
| 4,547,246 A | 10/1985 | Viriyayuthakorn et al. | |
| 4,562,990 A | 1/1986 | Rose | |
| 4,572,523 A | 2/1986 | Guettouche et al. | |
| 4,588,546 A | 5/1986 | Feil et al. | |
| 4,665,653 A * | 5/1987 | Franz et al. | 49/477.1 |
| 4,666,649 A | 5/1987 | Takubo et al. | |
| 4,678,526 A | 7/1987 | Hawerkamp | |
| 4,683,166 A | 7/1987 | Yuto et al. | |
| 4,703,639 A | 11/1987 | Fuchs, Jr. | |
| 4,756,339 A | 7/1988 | Buluschek | |
| 4,779,651 A | 10/1988 | Hegler et al. | |
| 4,789,327 A | 12/1988 | Chan et al. | |
| 4,808,098 A | 2/1989 | Chan et al. | |
| 4,846,660 A | 7/1989 | Drossbach | |
| 4,849,113 A | 7/1989 | Hills | |
| 4,854,416 A | 8/1989 | Lalikos et al. | |
| 4,862,728 A | 9/1989 | Hardouin | |
| 4,862,924 A | 9/1989 | Kanao | |
| 4,900,503 A | 2/1990 | Hegler et al. | |
| 4,906,496 A | 3/1990 | Hosono et al. | |
| 4,970,351 A | 11/1990 | Kirlin | |
| 5,045,254 A | 9/1991 | Peelman et al. | |
| 5,058,934 A | 10/1991 | Brannon | |
| 5,089,074 A | 2/1992 | Winter et al. | |
| 5,124,109 A | 6/1992 | Drossbach | |
| 5,129,428 A | 7/1992 | Winter et al. | |
| 5,129,429 A | 7/1992 | Winter et al. | |
| 5,129,685 A | 7/1992 | Engel | |
| 5,145,545 A | 9/1992 | Winter et al. | |
| 5,156,901 A | 10/1992 | Tanaka | |
| 5,192,834 A | 3/1993 | Yamanishi et al. | |
| 5,222,288 A | 6/1993 | Thomas | |
| 5,228,479 A | 7/1993 | Thomas | |
| 5,256,233 A | 10/1993 | Winter et al. | |
| 5,262,109 A | 11/1993 | Cook | |
| 5,275,544 A | 1/1994 | Marlowe | |
| 5,279,332 A | 1/1994 | Winter et al. | |
| 5,314,553 A | 5/1994 | Hashimoto et al. | |
| 5,330,600 A | 7/1994 | Lupke | |
| 5,346,384 A | 9/1994 | Hegler et al. | |
| 5,372,774 A | 12/1994 | Lupke | |
| 5,383,497 A | 1/1995 | Winter et al. | |
| 5,383,998 A | 1/1995 | Lupke | |
| 5,391,334 A | 2/1995 | Enomoto | |
| 5,394,904 A | 3/1995 | Winter et al. | |
| 5,441,083 A | 8/1995 | Korsgaard | |
| 5,460,771 A | 10/1995 | Mitchell et al. | |
| 5,462,090 A | 10/1995 | Winter et al. | |
| 5,466,402 A | 11/1995 | Lupke | |
| 5,469,892 A | 11/1995 | Noone et al. | |
| 5,472,659 A | 12/1995 | Hegler et al. | |
| 5,472,746 A | 12/1995 | Miyajima et al. | |
| 5,522,718 A | 6/1996 | Dietrich | |
| 5,531,952 A | 7/1996 | Hatfield | |
| 5,545,369 A | 8/1996 | Lupke | |
| 5,572,917 A | 11/1996 | Truemner et al. | |
| 5,608,637 A | 3/1997 | Wang et al. | |
| 5,620,722 A | 4/1997 | Spina | |
| 5,649,713 A | 7/1997 | Ledgerwood | |
| 5,706,864 A | 1/1998 | Pfleger | |
| 5,715,870 A | 2/1998 | Winter et al. | |
| 5,759,461 A | 6/1998 | Jarvenkyla et al. | |
| 5,773,044 A | 6/1998 | Dietrich et al. | |
| 5,848,618 A | 12/1998 | Guest | |
| 5,894,865 A | 4/1999 | Winter et al. | |
| 5,901,754 A | 5/1999 | Elsässer et al. | |
| 5,904,643 A | 5/1999 | Seeberger et al. | |
| 5,909,908 A | 6/1999 | Furuse | |
| 5,912,023 A | 6/1999 | Katoh et al. | |
| 5,975,143 A | 11/1999 | Järvenkylä et al. | |
| 5,976,298 A | 11/1999 | Hegler et al. | |
| 6,000,434 A | 12/1999 | Winter et al. | |
| 6,016,848 A | 1/2000 | Egres, Jr. | |
| 6,039,082 A | 3/2000 | Winter et al. | |
| 6,062,268 A | 5/2000 | Elsässer et al. | |
| 6,082,741 A | 7/2000 | Gregoire et al. | |
| 6,161,591 A | 12/2000 | Winter et al. | |
| 6,186,182 B1 | 2/2001 | Yoon | |
| 6,199,592 B1 | 3/2001 | Siferd et al. | |
| 6,240,969 B1 | 6/2001 | Wildermuth | |
| 6,335,101 B1 | 1/2002 | Haeger et al. | |
| 6,399,002 B1 | 6/2002 | Lupke et al. | |
| 6,405,974 B1 | 6/2002 | Herrington | |
| 6,461,078 B1 | 10/2002 | Presby | |
| 6,491,994 B1 | 12/2002 | Kito et al. | |
| 6,524,519 B1 | 2/2003 | Ohba et al. | |
| 6,555,243 B2 | 4/2003 | Flepp et al. | |
| 6,591,871 B2 | 7/2003 | Smith et al. | |
| 6,607,010 B1 | 8/2003 | Kashy | |
| 6,631,741 B2 | 10/2003 | Katayama et al. | |
| 6,645,410 B2 | 11/2003 | Thompson | |
| 6,682,677 B2 | 1/2004 | Lobovsky et al. | |
| 6,696,011 B2 | 2/2004 | Yun et al. | |
| 6,719,302 B2 | 4/2004 | Andrick | |
| 6,787,092 B2 | 9/2004 | Chan et al. | |
| 6,848,464 B2 | 2/2005 | Ransom | |
| 6,848,478 B2 | 2/2005 | Nagai | |
| 6,854,168 B2 | 2/2005 | Booms et al. | |
| 6,933,028 B2 | 8/2005 | Milhas | |
| 6,935,378 B2 | 8/2005 | Ikemoto et al. | |
| 6,955,780 B2 | 10/2005 | Herrington | |
| 7,074,027 B2 | 7/2006 | Starita | |
| 7,114,944 B2 | 10/2006 | Wolfe et al. | |
| 7,118,369 B2 | 10/2006 | Dietrich et al. | |
| 7,122,074 B2 | 10/2006 | Kim | |
| 7,140,859 B2 | 11/2006 | Herrington | |
| 7,156,128 B1 | 1/2007 | Kanao | |
| 7,185,894 B2 | 3/2007 | Kish et al. | |
| 7,347,225 B2 | 3/2008 | Nobileau | |
| 2002/0179232 A1 | 12/2002 | Thompson | |
| 2004/0146696 A1 | 7/2004 | Jones | |
| 2004/0187946 A1 | 9/2004 | Herrington | |
| 2004/0241368 A1 | 12/2004 | Iwata et al. | |
| 2005/0161947 A1 | 7/2005 | Skinner et al. | |
| 2006/0293159 A1 | 12/2006 | Neubauer | |
| 2007/0204929 A1 | 9/2007 | Jarvenkyla | |
| 2008/0118596 A1 | 5/2008 | Hetzner et al. | |

FOREIGN PATENT DOCUMENTS

| | | |
|---|---|---|
| DE | 1 704 718 | 7/1971 |
| DE | 2 042 031 | 5/1972 |
| DE | 2 413 878 | 2/1976 |
| DE | 2 403 618 | 12/1980 |
| DE | 2 804 540 C2 | 1/1984 |

| | | |
|---|---|---|
| DE | 297 06 045 | 6/1997 |
| EP | 0 041 252 | 12/1981 |
| EP | 0 096 957 B1 | 5/1989 |
| EP | 0 385 465 A2 | 3/1990 |
| EP | 0 385 465 B1 | 3/1990 |
| EP | 0 581 064 A1 | 7/1993 |
| EP | 0 726 134 B1 | 2/1996 |
| EP | 0 543 243 B1 | 2/1997 |
| EP | 0 600 214 B1 | 3/1998 |
| EP | 0 890 770 A2 | 5/1998 |
| EP | 0 890 770 B1 | 5/1998 |
| EP | 1 293 718 A2 | 3/2003 |
| EP | 0 600 214 B2 | 4/2006 |
| FR | 1 486 473 | 6/1967 |
| GB | 1 148 277 | 4/1969 |
| GB | 2 300 684 | 11/1996 |
| JP | 49 135472 | 11/1974 |
| JP | 56144943 | 11/1981 |
| JP | 57160518 | 10/1982 |
| JP | 58168422 | 10/1983 |
| JP | 59 026224 | 2/1984 |
| JP | 59114027 | 6/1984 |
| JP | 61135416 | 6/1986 |
| JP | 63 163925 | 10/1988 |
| JP | 06 64062 | 3/1994 |
| JP | 08-258175 | 10/1996 |
| JP | 08-258176 | 10/1996 |
| JP | 08 267128 | 10/1996 |
| JP | 2003062891 | 3/2003 |
| WO | WO 85/00140 | 1/1985 |
| WO | WO 98/12046 | 3/1998 |
| WO | WO 01/79737 A1 | 10/2001 |
| WO | WO 2004/094888 A1 | 11/2004 |

OTHER PUBLICATIONS

Foerst, Dr. Wilhelm, Ullmanns Encyklopädie der technischen Chemia, Urban & Schwarzenberg, Munchen, Berlin, Germany, pp. 52-53, 71-73, 1960.

U.S. Appl. No. 11/078,323, filed Mar. 14, 2005, entitled "Corrugated Pipe with Outer Layer".

Non-final Office Action dated Jul. 3, 2007, in U.S. Appl. No. 11/078,323.

Final Office Action dated Dec. 27, 2007, in U.S. Appl. No. 11/078,323.

Non-final Office Action dated May 29, 2008, in U.S. Appl. No. 11/078,323.

*Modern Plastics Worldwide*, Apr. 2008 edition, p. 35, "Device offers alternative for constant flow filtration."

* cited by examiner

EXTRUSION DIE VACUUM SEALS

FIELD OF THE INVENTION

The present invention relates to vacuum sealing an object as it passes through an extrusion die, and more particularly, to vacuum seals and related methods for selectively forming a vacuum between an extrusion die and a continuously-extruded product.

BACKGROUND OF THE INVENTION

In the manufacture of continuously-extruded products, it is sometimes desirable to extrude a layer of polymer onto an outer surface of a product. In some instances, it is beneficial to tightly bond this additional layer of polymer to the product.

For example, in the manufacture of triple wall pipe, such as corrugated polyethylene or polypropylene pipe, an outer layer of polymer may be extruded by a cross-head die onto the outside of a double wall pipe, as described in U.S. patent application Ser. Nos. 11/078,323 and 12/019,738 to Goddard et al. In order to improve the strength and durability of the resulting triple wall pipe, it may be desirable to improve the bond between the extruded outer layer and the underlying corrugated layer of the double wall pipe. One method for improving the bond includes extruding the outer layer onto the corrugated layer before the corrugated layer has fully cooled from its own extrusion process. Such a method may ensure that the two polymer layers intersperse and bond while at least partially molten and then cool into a uniformly-joined polymer structure. Because this method is not always sufficient, additional techniques may be desired for improving the strength of the bonding between the two layers.

For this reason, various attempts have been made at urging an outer layer of molten polymer firmly against a product as it is extruded. One method for achieving this includes lowering the atmospheric pressure in the space between the molten polymer and the product passing through the extrusion die. In the past for example, a fixed, upstream component of the extrusion die has been shaped such that it closely abuts, and even compresses, the extruded product. This upstream component of the extrusion die might have a fixed inner diameter that is equal to or less than the outer diameter of the extruded product, so as to create a permanent seal between the extrusion die and the product. For example, fixed-diameter sealing rings have been disposed at an upstream end of the extrusion die in order to form a closed space between the extrusion die and the product. A vacuum is then applied to the closed space to urge the molten polymer layer against the product. Unfortunately, such attempts often result in an unacceptable level of friction, or drag, against the travel of the product through the extrusion die.

Such fixed, drag-inducing extrusion die components may be particularly problematic when the product, such as a corrugated pipe, includes sections designed to have increased or decreased outer diameters. Moreover, during the extrusion of triple wall pipe, such drag may be especially undesirable during start-up or shut-down of the pipe extrusion process, when a puller is unable to move the product against the friction of the fixed sealing rings. Thus, fixed extrusion die components are often unsuitable for reliably sealing the product as it passes through the extrusion die.

Accordingly, there is a need for a vacuum seal and related methods for selectively forming a vacuum between an extrusion die and a continuously-extruded product.

SUMMARY OF THE INVENTION

It is an object of the present invention to provide such a vacuum seal and related methods for selectively forming a vacuum between an extrusion die and a continuously-extruded product.

One exemplary embodiment of the present invention provides an extrusion die configured to have an interior chamber sealed from the atmosphere. The extrusion die includes an extrusion die head disposed at a downstream end of the interior chamber; and a vacuum seal disposed at an upstream end of the interior chamber; wherein the vacuum seal is configured to selectively form a seal between the extrusion die and a product disposed in the interior chamber.

Another exemplary embodiment provides a vacuum seal for sealing an interior chamber of an extrusion die. The vacuum seal includes an annular sealing surface disposed at an inner diameter of the vacuum seal; a hollow, interior chamber; and a plurality of bellows disposed between the annular sealing surface and the extrusion die; wherein the vacuum seal is configured to selectively form a seal between the extrusion die and a product disposed in the interior chamber.

Yet another exemplary embodiment of the present invention provides a method of selectively sealing an end of an extrusion die. The method includes providing a vacuum seal at an upstream end of the extrusion die, the vacuum seal including an annular sealing surface disposed at an inner diameter of the vacuum seal; maintaining the vacuum seal in a sealing relationship between the extrusion die and a product traveling through the extrusion die when the extrusion die is operating normally; and applying a vacuum to an interior of the vacuum seal, thereby collapsing the vacuum seal when the extrusion die is not operating.

Yet another exemplary embodiment of the present invention provides a method of manufacturing a three-wall, corrugated polymer pipe. The method includes the steps of: co-extruding an inner pipe wall through an inner die passageway of an extrusion die and a corrugated outer pipe wall through an outer die passageway of the extrusion die, to form dual-wall corrugated pipe; extruding an outer layer of molten polymer through a cross-head, extrusion die onto the extruded dual-wall pipe; and forming a vacuum between the cross-head, extrusion die, the outer layer of molten polymer, and the extruded dual-wall pipe by selectively sealing an end of the cross-head, extrusion die.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the invention, and together with the description, serve to explain the principles of the invention.

As such, those skilled in the art will appreciate that the conception upon which this disclosure is based may readily be utilized as a basis for designing other structures, methods, and systems for carrying out the several purposes of the present invention. It is important, therefore, to recognize that the claims should be regarded as including such equivalent constructions insofar as they do not depart from the spirit and scope of the present invention.

DESCRIPTION OF THE EXEMPLARY EMBODIMENTS

Reference will now be made in detail to the exemplary embodiments of the invention described above and illustrated in the accompanying drawings.

Figure 1:
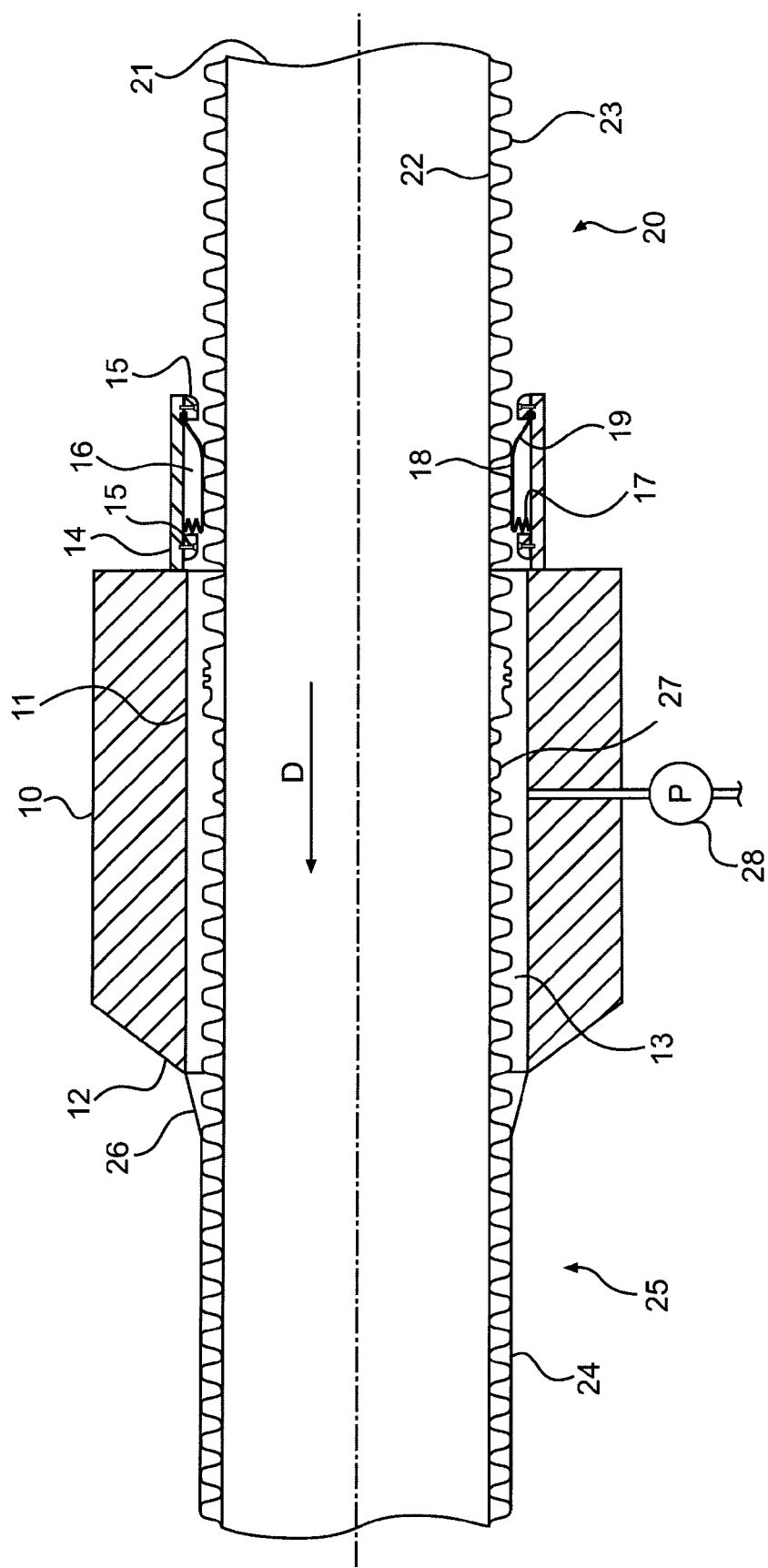
FIG. 1 illustrates a cross-section of an extrusion die and an exemplary vacuum seal in its inflated condition.

Generally, FIG. 1 illustrates an exemplary process by which an outer layer of polymer may be extruded onto a corrugated pipe. In particular, FIG. 1 illustrates a double wall pipe 20 traveling in a direction D as it enters an extrusion die 10. For example, the double wall pipe 20 may be moving in the direction D at a speed of approximately 3 ft/min. The double wall pipe 20 may include a pipe bore 21, a smooth inner wall 22, and a corrugated wall 23. In one embodiment, the corrugated wall 23 may have an outer diameter of approximately 30-40 inches.

The extrusion die 10 may be a component of any type of extrusion die system configured to continuously extrude an annular layer of polymer onto a product, such as the corrugated wall 23 of the double wall pipe 20. For example, in one embodiment, the extrusion die 10 may be a cross-head die having a distributor for forming an annular layer of polymer. As depicted in FIG. 1, the extrusion die 10 may extrude a layer of molten polymer 26 out of a downstream die head 12. As the layer of molten polymer 26 exits the downstream die head 12, the layer of molten polymer 26 may contact the double wall pipe 20 and form a smooth outer wall 24 on the corrugated wall 23, thereby forming a triple wall pipe 25.

In one embodiment, in order to improve the level of bonding between the smooth outer wall 24 and the corrugated wall 23 during this process, a vacuum may be applied to the upstream side of the layer of molten polymer 26 as it exits the downstream die head 12. A pressure differential created by such a vacuum may be used to urge the layer of molten polymer 26 against the crowns of the corrugated wall 23, thereby more securely bonding the resulting smooth outer wall 24 to the double wall pipe 20. In one exemplary embodiment, a pressure differential may be applied to the upstream side of the layer of molten polymer 26 by sealing and creating a vacuum within an interior die chamber 13, which is defined by an inner bore 11 of the extrusion die 10.

As illustrated in the embodiment of FIG. 1, the interior die chamber 13 may be sealed by providing a vacuum seal 16 at an upstream end of the extrusion die 10. For example, the extrusion die 10 may include an annular housing 14, which extends upstream from the extrusion die 10. In one embodiment, vacuum seal 16 may be removably attached by its outer diameter to an inner diameter of the annular housing 14. The annular housing 14 may include a plurality of clamp rings 15, which removably attach the vacuum seal 16 to the annular housing 14. For example, as illustrated in FIG. 1, the vacuum seal 16 may be retained by a first clamp ring 15 at its upstream end and a second clamp ring 15 at its downstream end. As will be appreciated by one of skill in the art, vacuum seal 16 may be mounted to an upstream end of the extrusion die 10 by any other suitable means that allows the quick and efficient replacement or repair of the vacuum seal 16.

The vacuum seal 16 may be any type of hollow, annular seal suitable for selectively forming a seal between the double wall pipe 20 and an upstream end of the extrusion die 10. In one embodiment, the vacuum seal 16 may be a hollow, inflatable tube configured to sit securely in a groove of the annular housing 14. Such a configuration may eliminate the need for clamp rings 15 altogether. In an alternative embodiment, the vacuum seal 16 may be an annular sheet of polymer, which can be expanded and contracted into and out of contact with the double wall pipe 20, by the force of an air pump or vacuum. Moreover, the vacuum seal 16 may be made from any type of resilient material suitable for forming such a seal. In one embodiment, the vacuum seal 16 may be formed out of an elastomeric or thermosetting polymer, such as rubber. Alternatively, the vacuum seal 16 may be formed out of silicone.

As illustrated in the embodiment of FIG. 1, the vacuum seal 16 may include an annular sealing surface 18, which may contact the double wall pipe 20. In one embodiment, the annular sealing surface 18 may be long enough in the axial direction of the pipe to extend across at least two corrugations of the corrugated wall 23. In another embodiment, the annular sealing surface 18 may extend across at least three corrugations of the corrugated wall 23.

On one end, the vacuum seal 16 may also include a plurality of bellows 17, which may extend between the annular sealing surface 18 and a portion of the vacuum seal 16 abutting the annular housing 14. According to a preferred embodiment, the vacuum seal 16 may include an angled shoulder 19 at an upstream end and a plurality of bellows 17 at a downstream end. This embodiment may advantageously prevent the vacuum seal 16 from rotating, or otherwise undesirably deforming, upon contact with the double wall pipe 20. Of course, as will be appreciated by one of skill in the art, the vacuum seal 16 may have any suitable shape, as long as it is conducive to being collapsed as desired. For example, the vacuum seal 16 may alternatively include bellows at both upstream and downstream ends, or alternatively, no bellows at all.

FIG. 1 illustrates the vacuum seal 16 in its naturally-expanded, or inflated, condition. That is, in its normal, unbiased state, the vacuum seal 16 may have an inner diameter (defined by the annular sealing surface 18), which approximates the outer diameter of the double wall pipe 20. For example, this inner diameter may be slightly smaller than, equal to, or slightly larger than the outer diameter of the double wall pipe 20. In this condition, the vacuum seal 16 may advantageously seal the interior die chamber 13, from which a pump 28 or other suitable device may remove gas, thereby creating a vacuum, and forming a pressure differential across the layer of molten polymer 26.

Specifically, the vacuum seal 16 may selectively form a seal between the double wall pipe 20 and the annular housing 14 of the extrusion die 10. Accordingly, the annular, interior die chamber 13 may be sealed off between opposing surfaces of the double wall pipe 20, the inner bore 11, the layer of molten polymer 26, and the vacuum seal 16. Having sealed the interior die chamber 13, a pump 28 may be incorporated into the extrusion die 10 to apply a vacuum of approximately 2-5 psi to the interior die chamber 13. The pump 28 may be any type of pump suitable for drawing a vacuum on the interior die chamber 13.

In certain circumstances, it may be unnecessary and in fact disadvantageous to maintain a seal at an upstream end of the extrusion die 10. Accordingly, the vacuum seal 16 may be selectively manipulated to open the interior die chamber 13 to atmospheric pressure. Specifically, the inner diameter (defined by the annular sealing surface 18) may be expanded to a diameter substantially larger than the outer diameter of the double wall pipe 20. In one embodiment, this inner diameter may be expanded by drawing gas out of the hollow interior of vacuum seal 16, so as to collapse, or deflate the vacuum seal 16. For example, any type of pump or vacuum may be applied to a passageway extending into the hollow interior of the vacuum seal 16.

Figure 2:
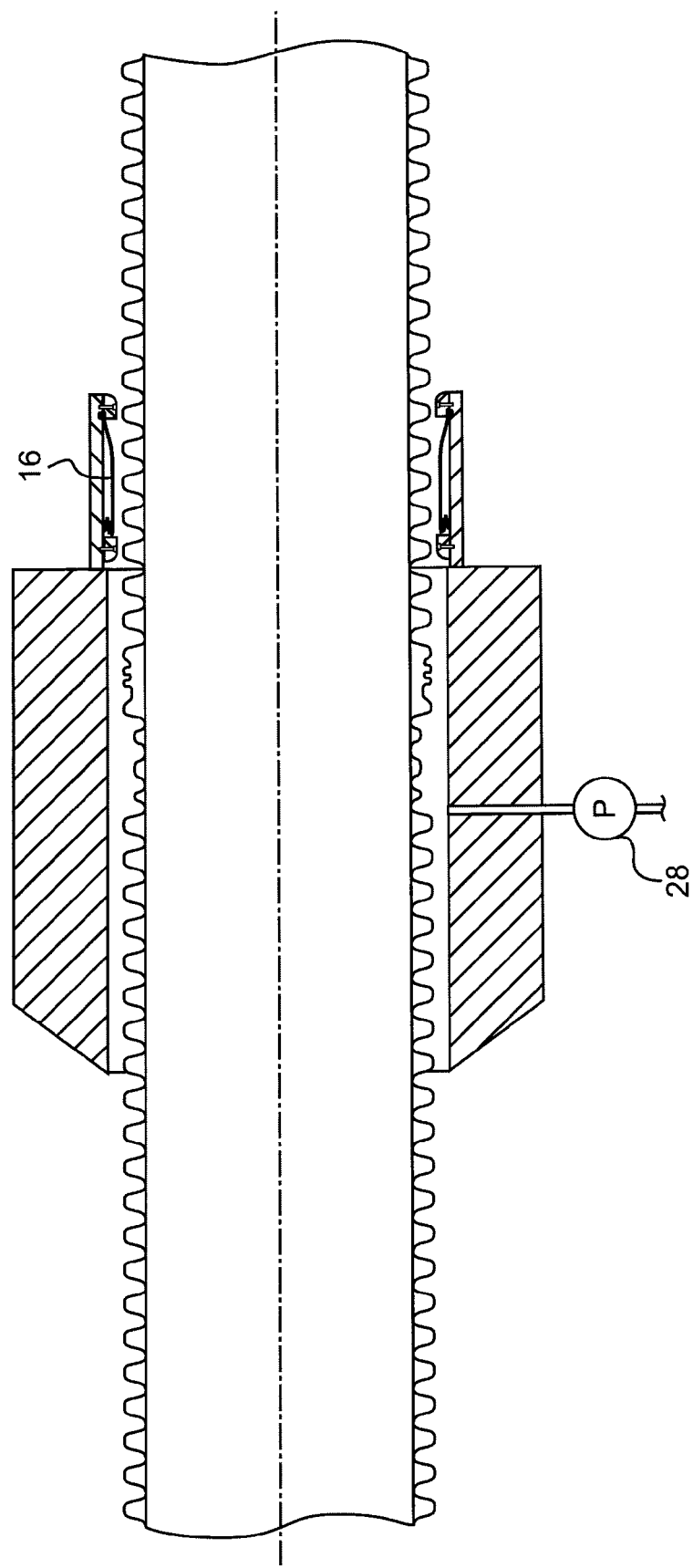
FIG. 2 illustrates the vacuum seal of FIG. 1 in its deflated condition.

FIG. 2 illustrates the vacuum seal 16 in this collapsed, or deflated, condition. In this manipulated state, the inner diameter of the vacuum seal 16 may advantageously provide approximately 1 inch of clearance between itself and the double wall pipe 20. Therefore, the vacuum seal 16 may avoid being impacted by irregularities in the geometry of the moving double wall pipe 20. Moreover, the vacuum seal 16 may avoid imposing a drag force against the pipe, during certain operations of the extrusion die 10.

Referring in particular to the operation of the extrusion die 10 and its vacuum seal 16, the vacuum seal 16 may be selectively manipulated to cooperate with the passage of a product through the extrusion die 10. In general, the vacuum seal 16 may be substantially unbiased during normal operation of the extrusion die 10. Specifically, the vacuum seal 16 may be either maintained in its natural condition or supplied with pressurized air or gas to urge the annular sealing surface 18 against a product moving through the extrusion die, such as the corrugated wall 23.

In one embodiment, the double wall pipe 20 may include portions of corrugated wall 23 that have a reduced outer diameter. For example, as illustrated in FIG. 1, the corrugated wall 23 may have a reduced-diameter portion 27, corresponding to an in-line pipe coupling structure, located approximately at 20 feet intervals along the length of pipe. In this case, the vacuum seal 16 may be supplied with sufficient additional amounts of pressurized air or gas for the annular sealing surface 18 to contact the reduced-diameter portion 27.

In some embodiments, certain reduced-diameter portions of the double wall pipe 20 may justify the use of more than one vacuum seal 16. For example, it may be desirable to include one or more additional vacuum seals disposed upstream from the vacuum seal 16 illustrated in FIG. 1. Such vacuum seals may include the same or varying geometries, as desired, to create a seal between the double wall pipe 20 and the extrusion die 10. In one embodiment, a plurality of vacuum seals may be spaced apart axially by a sufficient distance to ensure that at least one of the vacuum seals is contacting a standard diameter portion of the double wall pipe 20 while a reduced-diameter portion 27 is inside the interior die chamber 13.

Alternatively, there may be certain operations of the extrusion die 10 that would benefit from the vacuum seal 16 being collapsed, or deflated, as illustrated in FIG. 2. For example, the vacuum seal 16 may be deflated when the extrusion die 10 is not operating normally. Moreover, the vacuum seal 16 may be automatically deflated just before the extrusion die 10 is shut-down; while the extrusion die 10 is fully shut-down; and/or when the extrusion die 10 is undergoing an emergency shut-down. During such an emergency, a battery-powered back-off system might be unable to efficiently overcome the drag induced by an unbiased or inflated vacuum seal 16.

It is contemplated that the vacuum seal 16 may also be automatically-programmed and/or manually-overridden to deflate in any other situation during which a vacuum is not required in the interior die chamber 13 or during which drag against the double wall pipe 20 is undesirable.

In one particular embodiment, the extrusion die 10 and vacuum seal 16 may be used in a method of manufacturing a three-wall, corrugated polymer pipe. The method may include the steps of: co-extruding a smooth inner wall 22 through an inner die passageway of an extrusion die and a corrugated wall 23 through an outer die passageway of the extrusion die, to form double wall pipe 20; extruding an outer layer of molten polymer 26 through a cross-head, extrusion die onto the extruded double wall pipe 20; and forming a vacuum between the cross-head, extrusion die 10, the outer layer of molten polymer 26, and the double wall pipe 20 by selectively sealing an end of the cross-head, extrusion die 10.

An embodiment of a method for selectively sealing an end of the extrusion die 10 may include: providing a vacuum seal 16 at an upstream end of the extrusion die 10, the vacuum seal 16 including an annular sealing surface 18 disposed at an inner diameter of the vacuum seal 16; maintaining the vacuum seal 16 in a sealing relationship between the extrusion die 10 and a product traveling through the extrusion die 10 when the extrusion die 10 is operating normally; and applying a vacuum to an interior of the vacuum seal 16 so as to collapse the vacuum seal 16 when the extrusion die 10 is not operating.

Of course, even though the extrusion die 10 and vacuum seal 16 have been described with respect to the manufacture of a triple wall pipe 25, the presently-disclosed devices and methods may be applicable to the manufacture of literally any product having a layer of polymer continuously-extruded onto its surface.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An extrusion die configured to have an interior chamber sealed from the atmosphere, the extrusion die comprising:
   an extrusion die head disposed at a downstream end of the interior chamber; and
   a vacuum seal disposed at an upstream end of the interior chamber, the vacuum seal having an angled shoulder at an upstream end, a plurality of bellows disposed at a downstream end, and a sealing surface disposed between the angled shoulder and the plurality of bellows;
   wherein the vacuum seal is configured to selectively form a seal between the extrusion die and a product disposed in the interior chamber.

2. The extrusion die of claim 1, wherein:
   the annular sealing surface is disposed at an inner diameter of the vacuum seal.

3. The extrusion die of claim 1, wherein the product is a polymer pipe and the extrusion die head is configured to continuously-extrude a layer of molten polymer onto the polymer pipe.

4. The extrusion die of claim 1, wherein a vacuum chamber is created when the seal is formed between the extrusion die and a product disposed in the interior chamber.

5. The extrusion die of claim 4, wherein the extrusion die further comprises a pump configured to remove gas from the vacuum chamber.

6. The extrusion die of claim 1, wherein the extrusion die further comprises an annular housing extending upstream from the upstream end of the interior chamber; and
   wherein an outer diameter of the vacuum seal is removably attached to an inner diameter of the annular housing.

7. The extrusion die of claim 6, wherein the annular housing comprises a clamp ring configured to removably attach the outer diameter of the vacuum seal to the inner diameter of the annular housing.

8. The extrusion die of claim 1, wherein the vacuum seal is hollow and a passageway extends between an interior chamber of the vacuum seal and an exterior of the vacuum seal.

9. The extrusion die of claim 8, wherein the extrusion die further comprises a means for selectively injecting gases into and removing gases from the interior of the vacuum seal.

10. A vacuum seal for sealing an interior chamber of an extrusion die, the vacuum seal comprising:
    an annular sealing surface disposed at an inner diameter of the vacuum seal for defining a hollow, interior chamber;
    an angled shoulder disposed at an upstream end of the vacuum seal; and
    a plurality of bellows disposed at a downstream end of the vacuum seal;
    wherein the vacuum seal is configured to selectively inflate to form a seal between the extrusion die and a product disposed in the interior chamber of the extrusion die.

11. The vacuum seal of claim 10, wherein:
    the vacuum seal is removably attached at an outer diameter to an upstream end of the interior chamber of the extrusion die; and
    an extrusion die head is disposed at a downstream end of the interior chamber of the extrusion die.

12. The vacuum seal of claim 11, wherein the product is a polymer pipe and the extrusion die head is configured to continuously-extrude a layer of molten polymer onto the polymer pipe; and
    wherein a vacuum chamber is created when the seal is formed between the extrusion die and a product disposed in the interior chamber.

13. The vacuum seal of claim 10, wherein a passageway extends between the interior chamber of the vacuum seal and an exterior of the vacuum seal.

14. The vacuum seal of claim 13, wherein the passageway allows gas to be selectively introduced to and removed from the interior chamber of the vacuum seal.

15. The vacuum seal of claim 10, wherein the plurality of bellows are configured such that the vacuum seal collapses along the bellows when gas is removed from the interior chamber of the vacuum seal.

16. The vacuum seal of claim 15, wherein the inner diameter of the annular sealing surface increases when the vacuum seal collapses.

17. The vacuum seal of claim 10, wherein the inner diameter of the annular sealing surface decreases when gas is injected into the interior chamber of the vacuum seal.

18. The vacuum seal of claim 10, wherein the product is a corrugated, polymer pipe; and
    the annular sealing surface extends a length in an axial direction, said length extending across at least two corrugations of the corrugated, polymer pipe.

19. The vacuum seal of claim 10, wherein the product is a corrugated, polymer pipe; and
    the annular sealing surface extends a length in an axial direction, said length extending across at least three corrugations of the corrugated, polymer pipe.

* * * * *